UNITED STATES PATENT OFFICE.

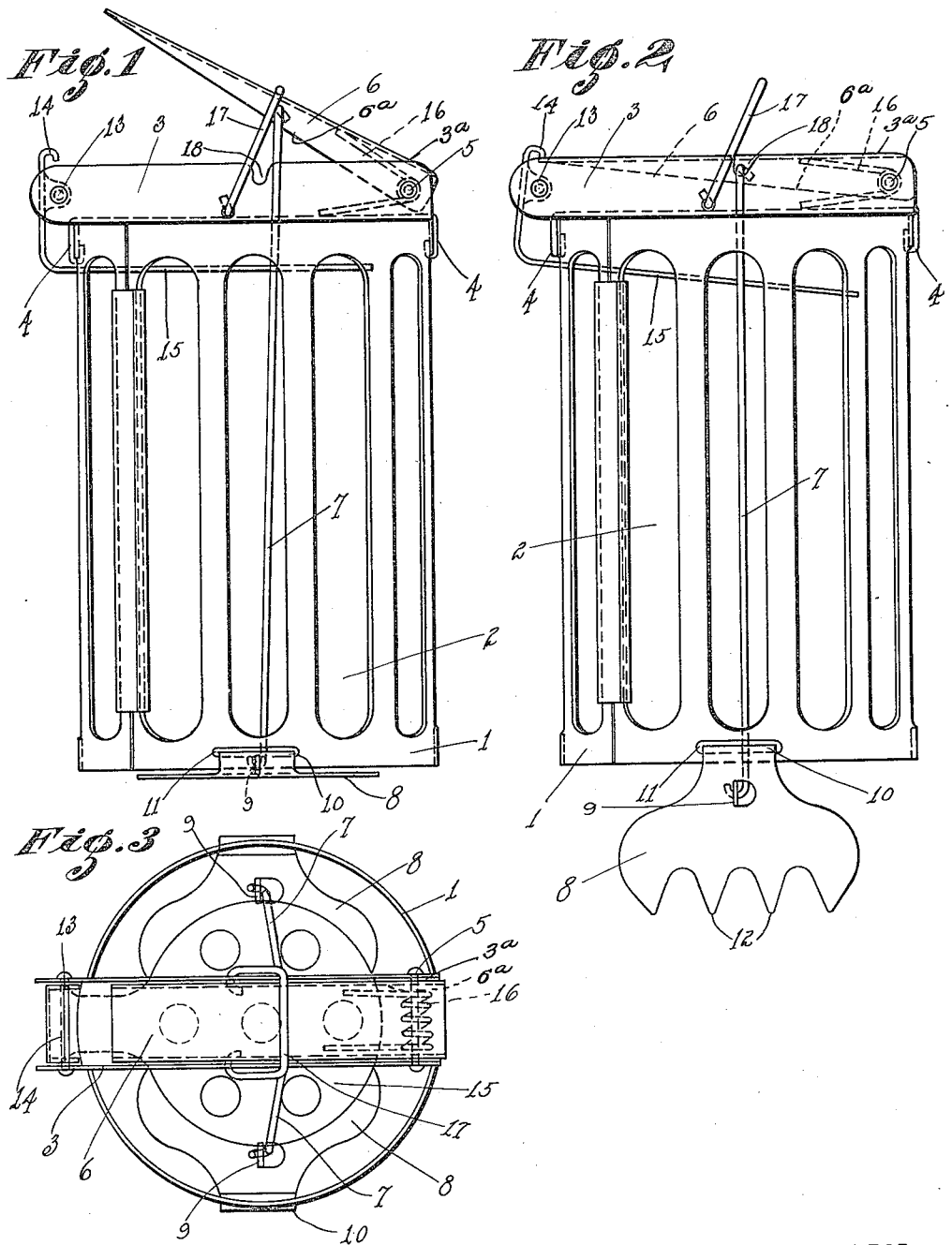

JACOB MILO WOLFE, OF LATHROP, CALIFORNIA.

RODENT-TRAP.

1,153,988.  Specification of Letters Patent.  Patented Sept. 21, 1915.

Application filed August 22, 1914. Serial No. 858,049.

*To all whom it may concern:*

Be it known that I, JACOB MILO WOLFE, a citizen of the United States, residing at Lathrop, in the county of San Joaquin and State of California, have invented certain new and useful Improvements in Rodent-Traps; and I do declare the following to be a clear, full, and exact description of the same, such as will enable others skilled in the art to which it appertains to make and use the same, reference being had to the accompanying drawings, and to the characters of reference marked thereon, which form a part of this application.

This invention relates to improvements in traps for rodents and is particularly adapted for gophers or similar small animals, the object of the invention being to produce a trap which will have a positive release for the trigger and also one which will have hinged jaws adapted to close in against the animal from the outside of the trap to the inside, thus having a tendency to force the rodent into the trap as they engage its body.

A further object of the invention is to produce a baitless trap, but one which will be so constructed as to have no tendency to frighten the animal away.

A still further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claims.

On the drawings, similar characters of reference indicate corresponding parts in the several views.

Figure 1 is a view showing the trap closed. Fig. 2 is a view showing the trap open. Fig. 3 is a top view of the trap when closed.

Referring now more particularly to the characters of reference on the drawings, the numeral 1 designates the cylindrical metal frame with longitudinal openings 2 and fastened to the top thereof I have provided the metal cross piece 3 which is held rigidly against the frame 1 by means of lips 4 which are bent downwardly and then up on the inside of the frame, as clearly shown in the drawings. The cross piece 3 has upturned edges 3ª forming a channel shaped member. Between these upturned edges 3ª, at one end, I have hinged, by means of a pin 5, a detent 6, this detent likewise having upturned edges 6ª which fit between the upturned edges 3ª. These edges 6ª taper from the pivotal point 5 to the free end of the detent 6, as shown clearly in Fig. 1. To these upturned edges 6ª are flexibly fastened rods 7 leading to the bottom portion of the frame 1 where they are hooked into jaws 8 through lugs 9 integral with said jaws 8. These jaws 8 are hinged to the frame, as at 10, by bending the small end of the jaw through a slot 11 and around the frame 1 and are provided with a plurality of points 12 for more properly engaging the body of the animal when they close inwardly to the position as shown in Fig. 1. Also, hinged by means of a pin 13 between the upturned edges of the cross piece 3, is a catch member 14 integral with which is the annular portion 15 hanging pivotally within the frame 1, as shown.

Upon the pin 5, between the detent 6 and the cross piece 3, I have provided a spring 16, its action tending to throw the detent 6 into the position as shown in Fig. 1. The detent can move only enough to close the jaws as I have provided a stop 17 which is hooked on either side into the cross piece 3 and bent up around the detent as shown. In the cross piece 3 I have provided a slot 18 which will allow the rods 7 a full movement when the detent is brought into place.

To set the trap, the detent 6 is pushed downwardly until it lies within and flush with the edges of the cross piece 3, whereupon the catch 14 is pushed into place, as shown in Fig. 2. The jaws 8 will now be open and any slight pressure exerted upon the member 15 will spring the trap, thereby closing said jaws.

It is a well known fact that a gopher lives in a short burrow or tunnel-way a few inches below the surface of the ground and keeps the end leading to the open closed with the dirt dug from the tunnel. To set the trap, this loose dirt is scraped away and the trap, jaws downward, is inserted into the hole and covered with a handful of grass or straw. The gopher finding an opening will immediately proceed to close the same by pushing a small load of dirt ahead of him with his head and incidentally into the said trap against the plate 15 thereof, which will set into action the mechanism hereinbefore described.

As has been noted from the foregoing description, the trap when set is pushed directly down into the rodent's hole and thus is susceptible of having dirt fall all around it and in order to obtain the best effect from the trap to prevent the spring detent from being clogged or interfered with so that this operation will be complete, I have provided the upturned edges 3ª and 6ª with the edges 6ª closing in between the edges 3ª to inclose the detent and its spring and operating parts in a box-like receptacle so that no dirt or other material can work between the same when the trap is inserted into the rodent's hole, aforesaid. An example of this is shown clearly in Fig. 2.

From the foregoing description it will readily be seen that I have produced such a device as substantially fulfils the objects of the invention as set forth herein.

While this specification sets forth in detail the present and preferred construction of the device, still in practice, such deviations from such detail may be resorted to as do not form a departure from the spirit of the invention as defined by the appended claims.

Having thus described my invention what I claim as new and useful and desire to secure by Letters Patent is:—

1. A device of the character described comprising a cage, a cross piece at one end of said cage, upturned edges on said cross piece, a spring pressed detent pivotally mounted between said edges at one end, said detent being adapted to move between said upturned edges on said cross piece, rods hooked to either side of said detent, jaws on the opposite end of said cage, said rods being connected with said jaws, and a catch and releasing member pivotally mounted on said cross piece and engageable with said detent, as described.

2. A device of the character described comprising a cage, a cross piece at one end of said cage, said cross piece having upturned edges forming a channel, a spring pressed detent hinged between said upturned edges at one end thereof, said detent having upturned edges movable between the upturned edges of said cross piece, jaws hinged to the opposite end of said cage, rods connecting said detent with said jaws, and a pivoted catch and releasing member engageable with said detent, as described.

In testimony whereof I affix my signature in presence of two witnesses.

JACOB MILO WOLFE.

Witnesses:
STEPHEN N. BLEWETT,
FLOYD M. BLANCHARD.

Copies of this patent may be obtained for five cents each, by addressing the "Commissioner of Patents, Washington, D. C."